(12) United States Patent
Yerli

(10) Patent No.: US 8,719,093 B2
(45) Date of Patent: May 6, 2014

(54) MULTI-USER COMPUTER-CONTROLLED ADVERTISEMENT PRESENTATION SYSTEM AND A METHOD OF PROVIDING USER AND ADVERTISEMENT RELATED DATA

(75) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 100 days.

(21) Appl. No.: 13/043,550

(22) Filed: Mar. 9, 2011

(65) Prior Publication Data

US 2011/0225040 A1 Sep. 15, 2011

Related U.S. Application Data

(60) Provisional application No. 61/311,830, filed on Mar. 9, 2010.

(51) Int. Cl.
*G06Q 30/00* (2012.01)
*A63F 13/00* (2014.01)
*G06Q 30/02* (2012.01)
*A63F 13/12* (2006.01)

(52) U.S. Cl.
CPC ........ *G06Q 30/0255* (2013.01); *G06Q 30/0251* (2013.01); *A63F 13/12* (2013.01)
USPC .......... 705/14.53; 705/14.49; 463/42; 463/40

(58) Field of Classification Search
USPC ...................................................... 705/14.66
See application file for complete search history.

(56) References Cited

U.S. PATENT DOCUMENTS

| 6,056,640 | A | 5/2000 | Schaaij |
| 6,257,982 | B1 | 7/2001 | Rider et al. |
| 2002/0128908 | A1* | 9/2002 | Levin et al. ..................... 705/14 |
| 2004/0015608 | A1* | 1/2004 | Ellis et al. ..................... 709/246 |
| 2004/0210923 | A1 | 10/2004 | Hudgeons et al. |
| 2008/0097830 | A1* | 4/2008 | Kim ............................... 705/10 |
| 2010/0023338 | A1* | 1/2010 | Petronelli et al. ................ 705/1 |

OTHER PUBLICATIONS

EP 11 15 6865; European Search Report dated May 23, 2011.

* cited by examiner

*Primary Examiner* — John G Weiss
*Assistant Examiner* — Scott C Anderson
(74) *Attorney, Agent, or Firm* — Renner, Otto, Boisselle & Sklar, LLP

(57) ABSTRACT

A system and method for presenting advertisements to a plurality of users is described, wherein the system comprises at least one display device for displaying advertisements to an audience of at least two users; a plurality of user input devices, at least one for each user, providing user input data to the system; and at least one computing device executing a software application controlled by the user input data for providing output to the display device to display the advertisement with at least one conjointly controlled advertising object, wherein the at least one computing device provides user and advertisement related data to a central data system, which are generated from data related to the advertising object and from the input data occurring in response to the display of the advertising object.

12 Claims, 3 Drawing Sheets

MULTI-USER COMPUTER-CONTROLLED ADVERTISEMENT PRESENTATION SYSTEM AND A METHOD OF PROVIDING USER AND ADVERTISEMENT RELATED DATA

FIELD OF THE INVENTION

The present invention relates to a multi-user computer-controlled advertisement presentation system and to a method of providing user and advertisement (advertised product and/or service) related data to a remote central data system such as a system for market research analysis. In particular the present invention relates to a system for providing interactive advertisement to an audience of a plurality of users at a theater, a cinema or at any other location of presentation. In particular the invention also relates to a method for providing user related data derived from raw input data or from preprocessed input data which occur by the users' reactions and responses to a running advertisement and which are useful to enhance market research prospects. Moreover the invention relates to a system and a method for video gaming including an user-controllable interactive presentation of multimedia advertisement.

BACKGROUND OF INVENTION

Systems and methods for multimedia advertisement are well-known as such. These systems usually provide the presentation of advertisement to an audience in a cinema, to TV viewers via TV channels, to Internet users via websites etc. Since conventional advertisement is just presented to be watched by the consumers a drawback of these conventional systems is that the consumers often consider advertisement to be annoying rather than to be entertaining. In the field of Internet advertisement new systems and methods for interactively delivering advertisement have been developed as it is disclosed e.g. in US 2008/0077478 A1. These systems and methods simply polls the users to generate for each user profile data, so-called cookie, which is embedded on his/her web browser. In the field of video games new systems and methods for advertising gaming have been developed such as the one being disclosed in U.S. Pat. No. 6,267,675. These systems are designed to manage each user as a single gamer playing against the gaming computer and/or other gamers. Thus these systems are like conventional computer-controlled video gaming systems which are well-known from the field of Personal Computers or game consoles. These systems mainly include a computing device, i.e. the PC or console, a display device such as a monitor or TV screen, and two or more user input devices such as gamepads, joysticks etc. These systems are limited to a lower number of users and thus cannot be used to provide (advertising) games and entertainment to a larger group or audience having e.g. 50, 100 or even more users (players).

In order to extend the number of players new systems have been developed for so-called theater gaming which is a modern technology in the field of computer-based games. These systems comprise cinema equipment, a server and gamepads so that a large group of players, i.e. the theater audience, can jointly play computer games. Such a system is disclosed in U.S. Pat. No. 6,257,982 B1 which describes a large screen, interactive, computer-controlled motion picture theater video gaming system. The system comprises display devices (video projector with a large screen), a computing device (computer) for outputting video data to be outputted by the display devices. In order to provide user-control for running the game there are several user input devices (called "user stations"), one for each user and his/her individual input. These input devices have basically the normal design of game controllers, i.e. they have buttons, sticks, sliders and the like which are to be pressed or moved by the respective user. This means that each input device generates input data depending on the individual input of the respective user, the input data being sent to the computer for controlling the game, in particular for controlling the behavior of the user's avatar (personal game character) during the running game. Thus each user can participate to the game by interactively controlling his/her avatar or an associated object, like a car, a motorbike etc. However, it would be desirable to have also a conjointly control of the same object by two or more users during a running game, in particular during a running advertising game. Moreover, it would be desirable to have a multi-user controlled system for advertisement presentation wherein the user as a group can influence the process of the advertisement and wherein user and advertisement related data can be retrieved to (later) be analysed in a group or crowd related market research.

SUMMARY

According to a first aspect of the present invention there is provided a multi-user computer-controlled advertisement presentation system comprising:
   at least one display device for displaying advertisement to an audience of at least two users;
   a plurality of user input devices, at least one for each user, providing user input data to the computer-controlled advertisement presentation system;
   at least one computing device executing a software application controlled by said user input data or by control input data being generated thereof for providing output to the display device to display the advertisement with at least one conjointly controlled advertising object being displayed therein;
   wherein the at least one computing device provides user and advertisement related data to a central data system, the data being generated from the presentation of the advertising object and from the input data occurring in response to said presentation.

Further to this and in correspondence with said system a method of providing user and advertisement related data is disclosed, the method comprising the steps of:
   providing user input data which are generated by the plurality of user input devices;
   processing advertisement data about the displayed advertising object;
   processing user data by receiving and processing the user input data or the control input data;
   providing both the user and advertisement data to a central data system.

Thus an advertisement presentation (e.g. within a video game or any other software application) can be conjointly controlled by the audience. The described system allows a group of users to interact with an advertisement, in particular playing the advertisement e.g. in a cinema or over the Internet or the like. The group is able to influence the progress of the advertisement and thus also to give feedback in a direct and/or indirect way, i.e. the audience can be asked directly about their opinion on a specific product ("do you like it?"), or the collected game data could be analyzed on what onscreen item drew the most attention to itself (based on what onscreen item was selected as an avatar the most times).

In this respect user and advertisement related data reflecting the users' majority behavior and reaction on the advertised products and services are provided to a central data system for performing market search. Thus the provider or creator of the particular advertisement receives useful data about the response of the audience to the displayed advertisement. These data (telemetry data) which may also comprise polling information on the advertised product(s) and/or service(s) result on how the users react on the advertisement and can then be used for market and product research.

The present invention is also applicable to any user-controllable software application providing outputs to users such as video and/or audio outputs or even electro-mechanical outputs such as vibration of user devices etc. In particular the present invention allows to run software applications in the field of advertisement presentation and/or group gaming taking into account even hundreds of users' inputs. The at least one conjointly controlled advertising object can be a single object or element, in particular a video animated element, or can be a group or cluster of such objects/elements.

It is to be understood that the invention is not restricted to advertisement presentation as such, but can be applied to any computer-based application for providing information or entertainment to a plurality of users. Based on the audience behavior during the running application useful information about the users' responses to the displayed advertisement is retrieved and transmitted to a central data system.

In preferred embodiments of the invention the at least one computing device is realized by a workstation or a game server and the processing unit is realized as an external or internal part of said workstation or server.

The least one computing device may generate the user and product/service related data as telemetry data and may send them to said central data system via a network, in particular via the Internet.

The at least one computing device may comprise or may be connected to a processing unit receiving and processing the user input data from the plurality of user input devices to generate (compressed) control input data for a conjointly control of the at least one advertising object being displayed. The processing unit may process the user input data received from the plurality of user input devices to generate the control input data by at least one of the following operations:

- filtering and/or compressing the user input data, in particular by matching the user input data against at least one pattern;
- weighting the user input data, in particular by applying a weighting function to at least one of the user input data;
- adding meta data to the control input data, in particular meta data comprising information about the number of registered and/or active user input devices;
- processing the user input data according to pre-defined rules and/or rules being modified by said at least one computing device executing the game software application.

BRIEF DESCRIPTION OF THE DRAWINGS

Further features and advantages of the present invention, as well as the structure and operation of various illustrative embodiments of the present invention, are described in more detail below with reference to the accompanying schematic drawings, wherein.

DETAILED DESCRIPTION OF PREFERRED EMBODIMENTS

The present invention relates to a multi-user computer-controlled advertisement system and allows a group of users to interact with a presented advertisement. The invention provides advertisement in an entertaining way and gives two or more users, even hundreds of users, the conjointly control over one or more advertisement objects. The input data coming from the users may be processed, i.e. filtered and/or compressed, to generate compressed control input data or may be sent as raw data to the system. The system also evaluates the input data in response to the presented advertisement object to provide information data to a central data system which can be used for market research or the like. The proposed system allows at least one group of users to interact with an advertisement e.g. by playing an adverting game in a cinema or over the Internet or any other network. The group (s) is/are able to influence the progress of the advertisement by giving feedback at the input devices and thus to interactively control the advertisement. The system further generates information data (telemetry data) and provides them to a central data system which can be analyzed for market and product research, because these data specify the behavior of the users or each group and therefore give information about how users reacted to the presented product etc. Thus the direct impact of the advertisement can be measured through the interactivity of the users. Through the game controller the reaction of all users towards the content is saved as processed data, and in cases it is wanted by the customer also as raw data. This data is then analyzed through the application, for example in terms of product acceptance, attention or level of attraction.

Figure 1:
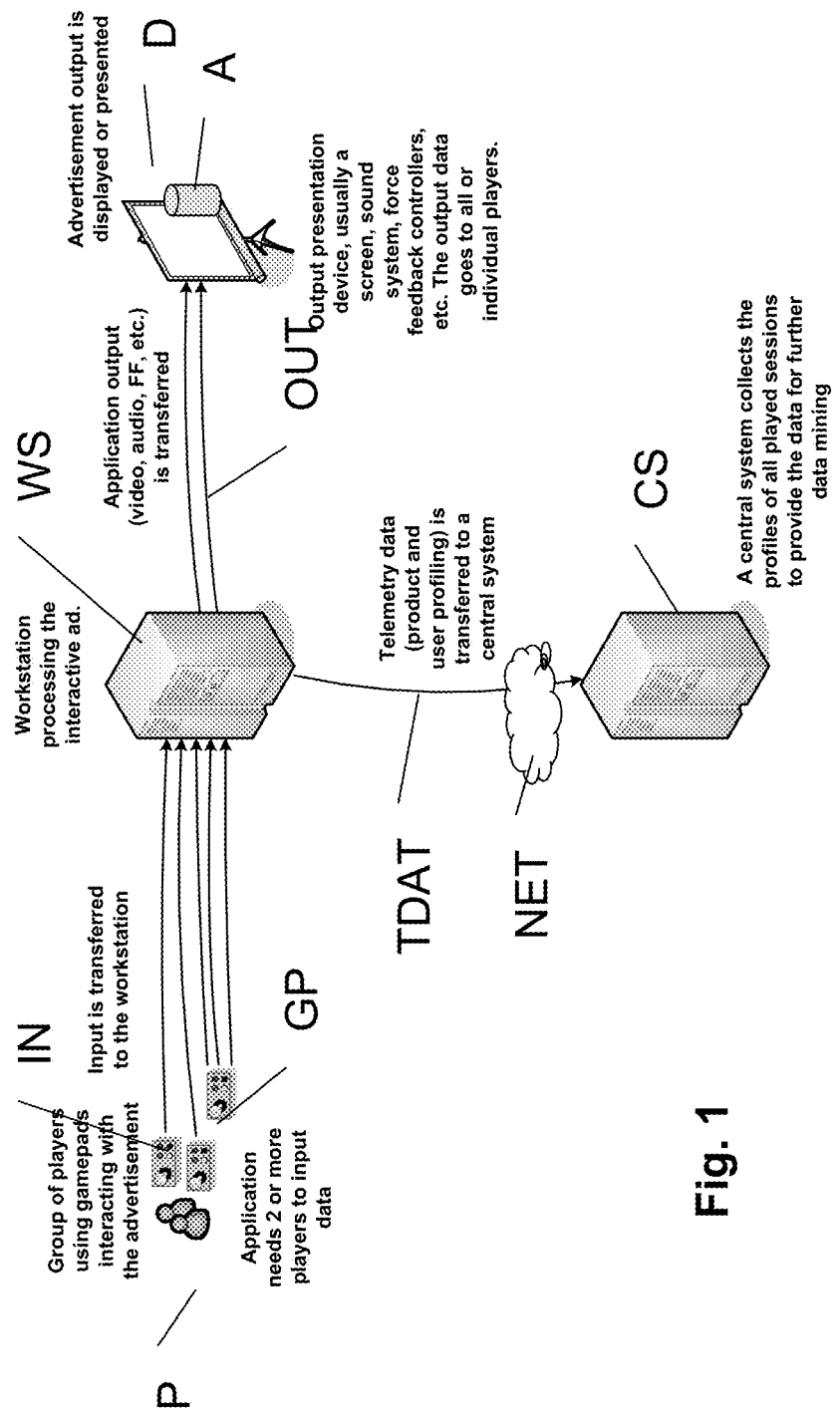
FIG. 1 shows the architecture of a multi-user computer-controlled advertisement presentation system of the present invention, wherein the system is connected to a remote central data system.

In FIG. 1 there is shown a multi-user computer-controlled advertisement presentation system which is realized as a video gaming system for presenting games and advertisements in a cinema or theater. The system comprises at least one display device being represented by a large screen D on which video game and advertisement pictures are projected and are shown to an audience of two or more users. The system further comprises at least one computing device which is represented here by a workstation WS executing a game software application and also a software application to present advertisement by providing output OUT (video/audio signal) to the display device D. Accordingly video game motion pictures and advertisement pictures are displayed.

In the shown embodiment the video game is an advertisement game called "Soft Drink Racing". With the help of this game the advertiser who offers soft drinks in tin cans shall be provided with user and product related data in order to find out which new product packaging is preferred by a representative audience. The advertising game is meant to be an interactive commercial running for a limited time on the screen D of the theater. In this gameplay there are advertising objects in form of tin cans of different colors which shall be moved by the audience by using the input devices, i.e. the gamepads GP. The more users press a certain button, the faster the preferred object (tin can) A moves forward. Winners are those who could move their colored tin can most fast. An introduction to the game may explain the rules of the game (e.g. "Please select your favorite tin can and make it move as fast as possible to win the race"), but it's up to the players to choose which of the presented tin cans they want to steer, i.e. want conjointly to be moved. The tin cans shall have different designs. The winning tin can is that one which is most liked by the majority of players.

Thus the present system allows that at least one conjointly controlled object, here the preferred tin can A, is displayed and moved like the majority of the users P wants to. The movement ("behavior") of said object A is conjointly controlled by user input data IN or by control input data IN* which are derived from evaluating the individual user input data IN coming from a plurality of user input devices GP which are located at the user seats of the theater. Thus the present system manages to offer interactive advertisements. Consequently the system does not simply transport advertisement message to the consumers (audience), but also provides participation to all users so that the advertisement is fun to play and creates positive emotion(s).

In order to enhance conjointly control of advertising objects, such as the tin cans A of the "Soft Drink Racing", the system comprises a processing unit PU (see FIG. 2) to which the gamepad controllers GP are connected. The processing unit PU can be an integral part of the workstation WS (see FIG. 1), but in the present embodiment the processing unit PU is realized by a separate unit being installed apart from but being connected with said workstation WS, e.g. by a local area network.

The processing unit PU receives the individual user input data IN which are just raw data and continuously processes these data to generate compressed control data IN* for a conjointly control of said advertising object A. Apparently the application, i.e. the game and/or advertisement software running on workstation WS, needs readable control data (instructions or commands) like "tin can moves forward", but the raw data IN coming from the users do not provide such discreet commands and are very voluminous. To overcome this problem, the invention generates discreet control input data IN* by processing the incoming user input data IN in such a way that the application can easily handle these data IN* and interpret/understand the commands thereof. Since the control data IN* are derived from many individual user input data, these data IN* reflect the shared and joint will of the users being involved.

Figure 2:
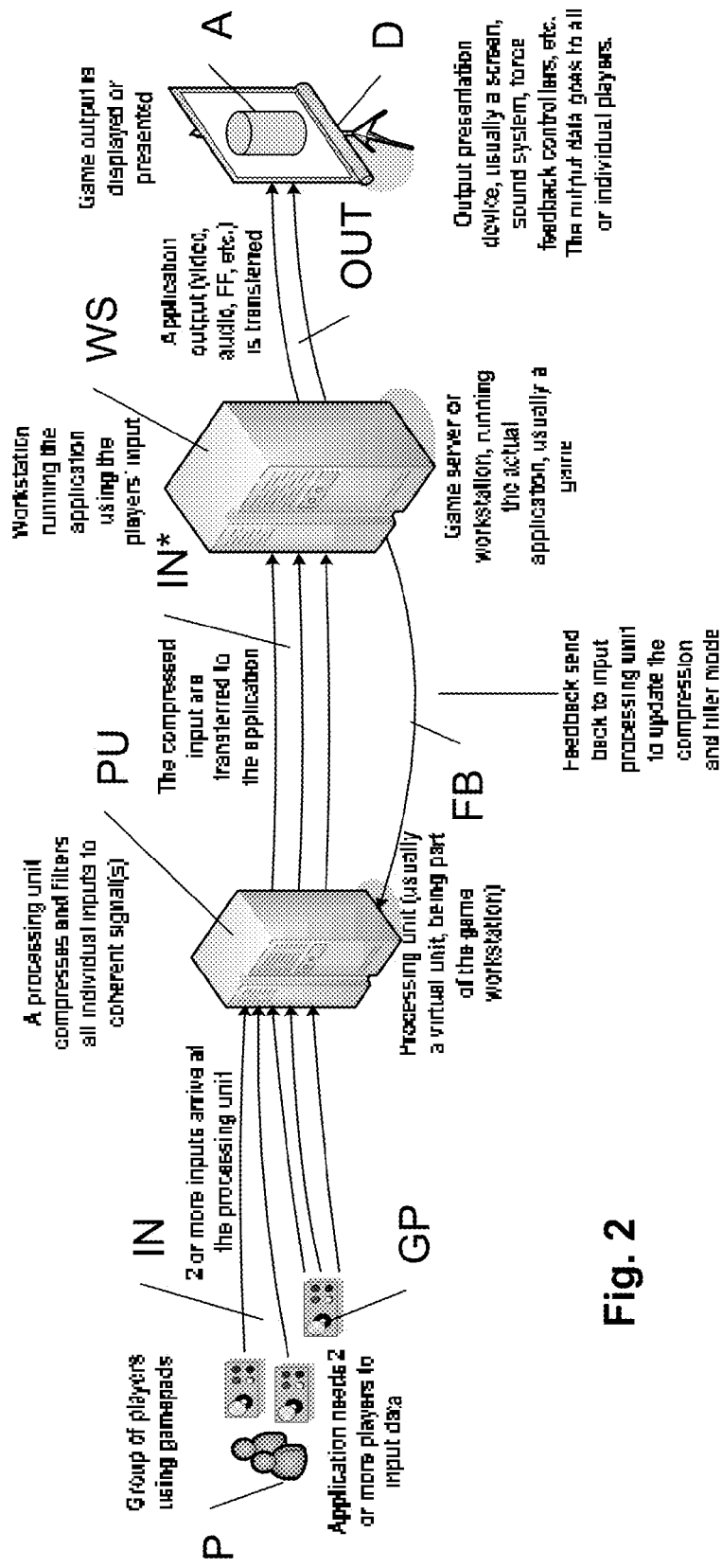
FIG. 2 shows in more detail the architecture of the system of FIG. 1.

As shown in FIG. 2 the system further comprises a feedback data link FB between the workstation WS and the processing unit PU. This link is used to modify and/or adapt the processing of the input data IN to the current needs of the running application. This preparation and processing of the user input data IN can be flexible and may react on the actual needs of the system.

The system can easily handle user input data from one or more groups of users separately. Thus a first group of users can collectively control their object, i.e. the tin can of the first group, whereas a second group can collectively control a different object being the tin can of this second group. This solution is very attractive for running game competitions between two or more groups.

Description of Interactive Advertisements:

The interactive advertisement can look like a typical crowd game, but doesn't have to look like a typical game. For example the advertisement could be like:

A classical film advertisement that adds interactivity on a simple level where users just tell if they like it or not. This can trigger certain alternative scenes in the advertisement to switch.

A classical film advertisement where the audience can move and rotate the camera around the scene (without changing the actual action) to get a different angle on the action. This can reveal where the attention of the audience is really focusing on.

A story based film advertisement where the climactic progression of the story can be changed by choosing different alternative paths of the story. This involves the audience deeper into the ongoing story.

a "sandbox"-like experiences where users can play around in a defined environment, e.g. controlling several water fountains pushing objects into the air to make them "dance".

The present system and method are applicable to all types of interactive applications for advertisement and provides many advantages, such as:

Getting into touch with the advertised product/service by acting with or on it increases the emotional relationship to the product and enhances remembering the product later.

Each application collects and processes the users' input data for further analysis in connection with the advertised product. This provides specific information on how consumers (i.e. the users) like the product with or without asking them directly.

Figure 3:
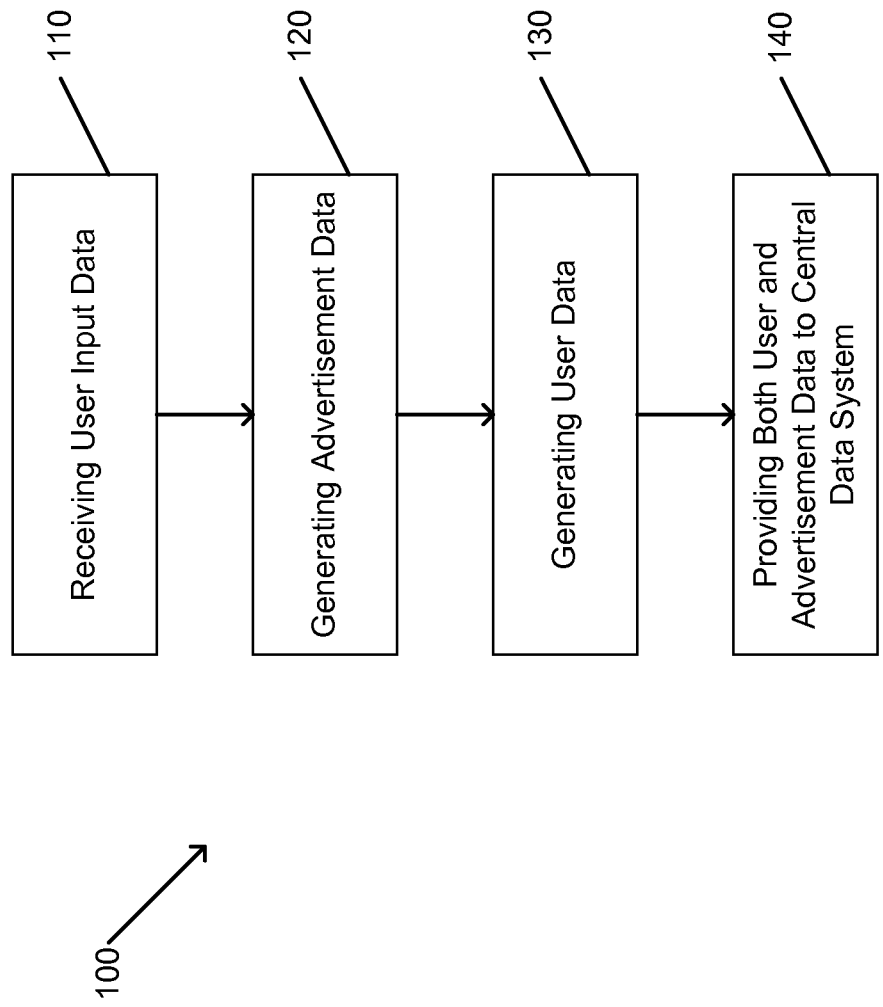
FIG. 3 shows a flow chart of a method of providing advertisement and user related data according to the invention.

The FIG. 3 schematically illustrates the steps of a method 100 of providing user and advertisement related data. The method 100 comprises the following steps of 110 to 140:

In a first step 110 the user input data are provided which are generated by the plurality of user input devices (see GP in FIGS. 1 and 2).

Then in step 120 advertisement data about the displayed advertising object, i.e the displayed tin can (see A in FIGS. 1 and 2) are processed.

In a following step 120 the user data are processed by receiving and processing the user input data or the control input data (see IN or IN* in FIG. 1 or 2).

Then in step 140 both the user and advertisement data are provided to a central data system (see CS in FIG. 1).

In more detail the method as shown in FIG. 3 and being performed on a system as shown in FIGS. 1 and 2 can be described as follows (reference is made to all FIGS. 1 to 3):

The user or players P using the gamepads GP input their data into the system. Two or more players are needed to use the application.

The input data IN data is transferred into the system. The application computes the data, either as raw data or preprocessed by a sub application running on the processing unit PU.

The advertisement application running on the workstation WS changes its state based on its own rules and on the inputs IN or IN* from the users. The updated application state is then output onto the output device(s), like the video screen D and/or audio output devices, vibration devices (controller force feedback) and others.

Simultaneously the user inputs IN or IN* along with the current application state are transferred in a compressed way to another system (i.e. central data system CS or remote workstation connected via the Internet NET) and are filed correctly with other data of the same application, but recorded earlier.

The saved data on the central system CS can then be accessed by other authorized applications that search and compute the data for analysis.

In every cinema that runs the interactive advertisement the input data of the users are collected and send to a remote central data system comprising an ad server. In addition to the input data created while playing the game more data on the background of the actual players can be collected. These data could be the user's characteristic features as socio demographical (age, gender, location e.g.) and psycho graphical (attitude, motive e.g.) samples and samples of the use and buy behavior (brand loyalty, favored brands e.g.). These are only a few samples which could be researched by interactive advertisement and market research.

The results of the data are transmitted to the central data system (advertisement client) for further research.

Description of Processing the User Input Data:

In basic terms a user P uses his/her input device GP to react on any advertisement presentation on the screen. Consequently individual input data IN of every single user are sent to the processing unit PU. This unit can be any software and/or hardware that can process the user input data of many users (e.g. a software function in the application or a stand alone server). The processed data will be sent as control data IN* to the application. The incoming input data IN can be processed in several ways. For example different patterns can be applied onto the data IN. All incoming data IN may be matched against one or more patterns. For some reason it might be desirable to adjust how much influence a given user input has. For this a function takes the input data and transfers the weighted data to the application. This function can mean to weight all inputs or only to partially weight some of the inputs. The processing unit PU can also provide the application with more data than only the pure control data IN*. These metadata can comprise for instance the number of registered input devices, what input devices are used, the number of active users and further more. To further enhance the compressing and filtering the processing unit PU may decide on given rules how the input data needs to be processed and which metadata needs to be sent.

In the following reference is made again to FIG. 2 for further describing the compression and filtering of multiple user inputs:

i) First the users or players P use the input devices to produce individual control inputs. These input data IN are then transferred as raw data to the data processing unit PU.

ii) The processing unit PU then processes and transforms the raw data into compressed data (control input data IN*) according to current rules which are defined by the game application. The processing unit can be a separate device (e.g. a PC), but can also be a specific application running on the workstation WS or just a part of the actual application running as a subroutine.

iii) The workstation WS running the actual application gets the processed input data IN*. The application changes its current state based on the input data. Any change in the requirements for future input data is transferred back to the processing unit PU by sending corresponding feedback data FB.

iv) The workstation WS then sends according to the new application state the output OUT to the display devices, like video screens and/or audio equipment, and optionally to other output devices such as electro-mechanical devices to produce gamepad vibrations the like. Hence the users see, hear and optionally feel the output as a result of the conjointly controlled action and can react on it again.

In particular each user expects a feeling of "having the control" of the running game (or application). For providing this feeling a dynamic feedback loop function may display to all users the current choices (or votes) of all users. Thus every user can instantly see if his/her individual input is in line with the most of the other inputs or not. Before the application will let avatar actually react each user can see onscreen what most of the users have chosen for the next action. In view of this "open voting" each user can reflect about his/her individual input and may overrule it. Thus the users' reactions are based on the application (displaying the current video scene) and on the choice of the other users (open voting). The amount of votes can change constantly (depending on the user's reaction). Thus the decision making is a highly dynamic process influenced by everyone. The application can decide by situation or time when the avatar actually shall react. The present system allows hundreds of users to feel that they are part of the action and have real influence on the application's progress.

In addition to the onscreen feedback the users are encouraged to communicate directly to each others, too. This increases the group feeling with the help of the onscreen feedback. The users not only interact with the application, but also with the whole group of users.

The described invention is not restricted to advertisement gaming, but can be applied to any software application which is running on a multi-user computer-controlled system for presenting advertisement to a plurality of users.

What is claimed is:

1. A multi-user computer-controlled advertisement presentation system comprising:
   at least one display device (D) having a size and/or position adapted to display one or more interactive advertisements to an audience of at least two users (P);
   a plurality of user input devices (GP), at least one for each user (P), providing user input data (IN) to the computer-controlled advertisement presentation system;
   at least one computing device (WS) executing a software application controlled by said user input data (IN) from the plurality of user input devices (GP) or by control input data (IN*) being generated thereof, said at least one computing device including hardware adapted to transmit output (OUT) to the at least one display device (D) to display at least one of the interactive advertisements with at least one advertising object (A) being displayed therein, wherein the at least one advertising object (A) is conjointly controlled by the audience of at least two users (P) utilizing the plurality of user input devices (GP), and wherein the audience of at least two users (P) influences a progress of the at least one of the interactive advertisements by providing the user input data (IN) at the plurality of input devices (GP);
   wherein the least one computing device (WS) is adapted to generate user and advertisement related data (TDAT) from data related to the at least one advertising object (A) and from the input data (IN, IN*) provided in response to said display of the at least one advertising object (A), and to provide the user and advertisement related data (TDAT) to a central data system (CS).

2. The multi-user computer-controlled advertisement presentation system of claim 1, wherein the system is a video, audio or multimedia presentation system, and wherein the at least one display device (D) comprises one or more of a video, audio or multimedia display device.

3. The multi-user computer-controlled advertisement presentation system of claim 1, wherein the at least one single advertising object (A) includes at least one video animated element.

4. The multi-user computer-controlled advertisement presentation system of claim 1, wherein the at least one computing device (WS) transmits the user and advertisement related data (TDAT) as telemetry data to said central data system (CS) via a network (NET).

5. The multi-user computer-controlled advertisement presentation system of claim 1, wherein the at least one computing device (WS) comprises or is connected to a processing unit (PU) receiving and processing the user input data (IN) from the plurality of input devices (GP) to generate the control input data (IN*) adapted to conjointly control the at least one advertising object (A) being displayed.

6. The multi-user computer-controlled advertisement presentation system of claim 1, wherein the system is a video gaming system and wherein the at least one computing device (WS) is realized by a game server executing a game software application.

7. The multi-user computer-controlled advertisement presentation system of claim 1, wherein the processing unit (PU) processes the user input data (IN) received from the plurality of user input devices (GP) to generate the control input data (IN*) by at least one of the following operations:
   filtering or compressing the user input data (IN), including matching the user input data (IN) against at least one pattern;
   weighting the user input data (IN), including applying a weighting function to at least one of the user input data (IN);
   adding meta data to the control input data (IN*), including meta data comprising information about the number of active user input devices (GP);
   processing the user input data (IN) according to rules which are modifiable by said at least one computing device (WS) executing the software application.

8. The multi-user computer-controlled advertisement presentation system of claim 5, wherein the at least one computing device (WS) is realized as a single workstation and the processing unit (PU) is realized as an external part of said workstation.

9. A computer-implemented method of providing user and advertisement related data, the method (100) comprising the steps of:
   displaying one or more interactive advertisements to an audience of at least two users on at least one display device;
   receiving, within a computing device, user input data generated by a plurality of user input devices utilized by the at least two users of the audience;
   executing, by the computing device, a software application controlled by said user input data from the plurality of user input devices;
   providing, by the computing device, output to the at least one display device to present at least one of the interactive advertisements with at least one advertising object, wherein the at least one advertising object is conjointly controlled by the audience of at least two users utilizing the plurality of user input devices and wherein the audience of at least two users influences a progress of the at least one of the interactive advertisements by providing the user input data at the plurality of input devices;
   generating, within the computing device, advertisement data based on data related to the at least one advertising object presented to the audience;
   generating, within the computing device, user data by processing the user input data provided in response to said presentation of the at least one advertising object to the audience; and
   providing, from the computing device, both the user and advertisement data to a central data system.

10. The computer-implemented method of claim 9, wherein the advertisement data comprises data about advertised products and/or services related to the at least one advertising object.

11. The computer-implemented method of claim 9, further comprising analyzing the user and advertisement data on the central data system by one or more of a market, product, service and/or or consumer research tool.

12. The computer-implemented method of claim 10, further comprising analyzing the user and advertisement data on the central data system by one or more of a market, product, service or consumer research tool.

\* \* \* \* \*